United States Patent [19]

Maddox

[11] 4,095,881

[45] Jun. 20, 1978

[54] EFFICIENT ILLUMINATION SYSTEM

[75] Inventor: Randall Adrian Maddox, Longmont, Colo.

[73] Assignee: International Business Machines Corporation, Armonk, N.Y.

[21] Appl. No.: 752,957

[22] Filed: Dec. 20, 1976

Related U.S. Application Data

[63] Continuation of Ser. No. 620,086, Oct. 6, 1975, abandoned.

[51] Int. Cl.² .............................................. G03B 27/52
[52] U.S. Cl. .......................................... 355/30; 362/3; 362/293; 362/298; 350/1.1; 355/71
[58] Field of Search ....................... 355/3 R, 8, 51, 30, 355/67, 71; 240/1.3, 20, 47, 92, 103 R, 41.25, 41.35 C, 41.35 R; 350/1

[56] References Cited

U.S. PATENT DOCUMENTS

| | | | |
|---|---|---|---|
| 3,038,372 | 6/1962 | Lessman | 240/41.25 |
| 3,270,194 | 8/1966 | Lee | 240/20 |
| 3,411,847 | 11/1968 | Barbieri | 355/30 |
| 3,455,622 | 7/1969 | Cooper | 350/1 |
| 3,532,424 | 10/1970 | Miles | 355/30 |
| 3,745,325 | 7/1973 | Harvey | 240/1.3 |
| 3,947,115 | 3/1976 | Hamaguchi | 355/67 X |
| 3,977,784 | 8/1976 | Hara | 355/67 |
| 3,982,116 | 9/1976 | Sakuma | 355/67 X |

OTHER PUBLICATIONS

"Tungsten Halogen Lamps in Photocopy Applications", R. P. Bonazoli & Emery G. Audesse, Sylvania Electric Prod. Inc.
IBM Tech. Disclosure Bulletin, "Copying Low-contrast Masters", G. T. Williams, vol. 15, No. 2, Jul. 1972.

*Primary Examiner*—Richard A. Wintercorn
*Attorney, Agent, or Firm*—Charles E. Rohrer

[57] ABSTRACT

An illumination system of particular use in document copiers wherein an incandescent lamp which may be of the tungsten-halogen type is located at the focal point of a reflector shaped as a conic section such as elliptical cylinder, directing light rays toward an interference filter for separating the IR radiation and redirecting the IR rays back to the incandescent lamp for heating the lamp. Both cold mirror and hot mirror embodiments of the system are disclosed.

18 Claims, 10 Drawing Figures

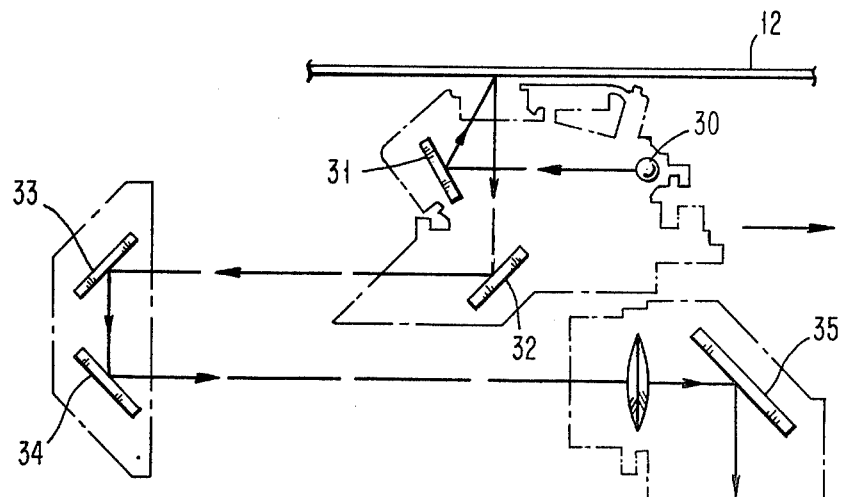
FIG. 10
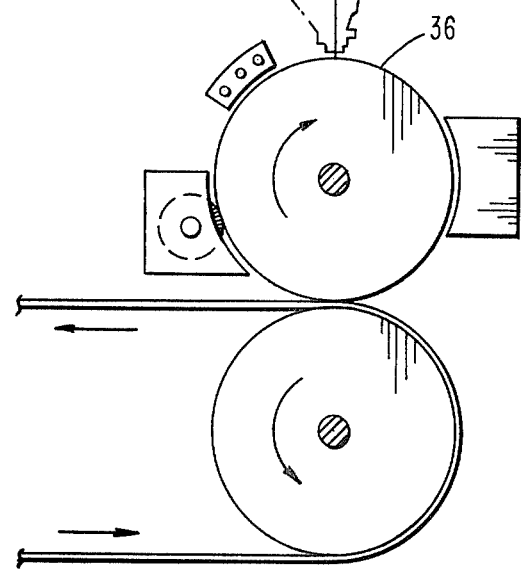

EFFICIENT ILLUMINATION SYSTEM

This is a continuation, of application Ser. No. 620,086 filed Oct. 6, 1975, and now abandoned.

This invention relates to the field of illumination and more particularly to the efficient utilization of the infra-red rays produced in an incandescent illumination system used in electrophotographic apparatus.

BACKGROUND OF THE INVENTION

Numerous geometric configurations of reflectors and filters employing various shape conic sections have been designed into illumination systems for reflecting and filtering light rays. Generally, in illumination systems used in xerographic reproducing apparatus, or other electrophotographic systems, it is desired to focus the visible spectrum produced by a light source onto a document scan station after filtering out the infra-red (IR) spectrum and directing those rays to a heat sink. In these prior art systems so-called hot mirrors are widely used and are effective for transmitting the visible spectrum while reflecting the infra-red rays. Cold mirrors which transmit IR while reflecting the visible spectrum are also used, and are preferable to hot mirrors since they usually produce a more efficient heat/light separation. However, both cold and hot mirror systems as known in the prior art have been designed to take the separated infra-red spectrum and direct it to a heat sink, and therefore that portion of the energy consumed by the light source going into the production of IR is wasted. It is, therefore, the general object of this invention to utilize the infra-red rays for useful purposes and thereby produce a more efficient illumination system. It is a more specific object of this invention to increase the efficiency of the illumination system by reflecting the infra-red spectrum onto the filament and thereby either decrease the amount of electrical energy needed to heat the filament or to produce a hotter filament.

In electrophotographic reproducing equipment, a focused line of light is passed from one end of a document scanning station to another. To achieve the movement of a line of light, many reproducing machines use a traveling carriage which supports the illumination system. It is another object of this invention that the heat produced by the light source be kept away from those components of the carriage which tend to warp from heat, resulting in carriage travel problems.

Tungsten-halogen lamps, a variety of incandescent lamps, are often used in electrophotographic reproducing apparatus. It is well known that the purpose of adding a halogen gas to the interior of a tungsten filament bulb is to maintain the illumination intensity of the filament over its entire life by preventing buildup of tungsten on the bulb wall. That is accomplished by the formation of a halogentungsten combination near or at the bulb wall thereby preventing the undesirable deposition of tungsten on the wall. However, in order for that combination to occur, it is necessary to heat the bulb wall above halogen temperature, which in the case of the halogen, bromine, is in the neighborhood of 200 degrees Celsius. It is, therefore, a further object of this invention to reflect infra-red heat generated by the light source back to the light source for the purpose of heating the bulb wall to aid in maintaining the temperature of the bulb wall above halogen temperature.

SUMMARY OF THE INVENTION

This invention involves the placement of an incandescent light source, preferably a tungesten-halogen bulb, at the focal point of a reflector which takes the shape of a conic section such as a section of an elliptical cylinder. Light rays emanating directly from the source and other light rays reflected from the reflector are then directed to a filter for the purpose of separating the visible and infra-red spectrums. The infra-red rays are then reflected back to the vicinity of the light source in order to heat the filament and the bulb wall.

BRIEF DESCRIPTION OF THE DRAWINGS

The foregoing and other objects, features and advantages of the invention will be apparent from the following more particular description of preferred embodiments of the invention, as illustrated in the accompanying drawings.

FIG. 10 shows an overall diagrammatic view of light reflection in a typical electrophotographic machine.

DETAILED DESCRIPTION

Figure 1:
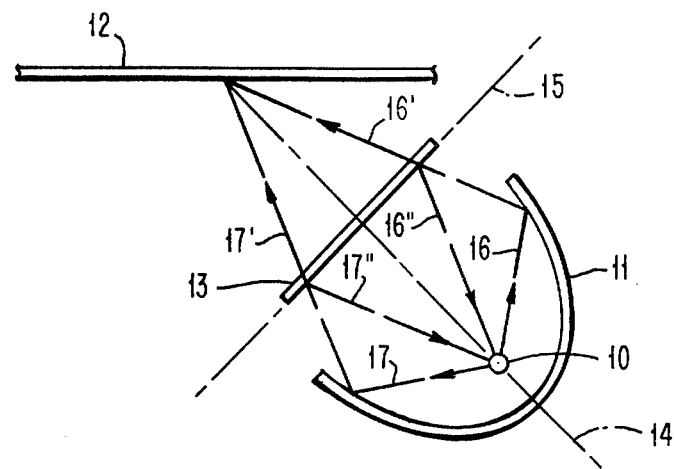
FIG. 1 shows an illumination system in which the visible spectrum is directly passed though a plane hot mirror while the infra-red spectrum is folded back upon the light source.

FIG. 1 shows an embodiment of the invention for use in electrophotographic apparatus wherein an incandescent lamp 10, which may be of the tungsten-halogen type, is placed at the focal point of a reflector 11. Reflector 11 can be shaped in the form of any suitable conic section, an elliptical form being illustrated in FIG. 1. While not shown in FIG. 1, both lamp 10 and reflector 11 are preferably cylindrical in shape in order to produce a line of light to scan a document to be copied; therefore, reflector 11 is a section an elliptical cylinder and lamp 10 is a cylindrical bulb located along the focal line of the elliptical reflector 11. The major and minor axis of the ellipse are shown at 14 and 15 respectively.

In operation in an electrophotographic copier, the visible spectrum produced by light source 10 is focused on the document glass 12 by the plane heat reflecting interference filter (hot mirror) 13, which also acts to reflect infra-red (IR) radiation back upon the incandescent lamp 10. Note that the plane filter 13 must be located along the minor axis 15 in order to reflect the IR rays to the lamp.

To illustrate the operation of the illumination system shown in FIG. 1, light rays 16 and 17 are shown emanating from incandescent lamp 10 and striking the elliptical cylinder reflector 11. From the reflector surface, ray 16 is directed toward filter 13, at which point the visible spectrum continues through the filter, as shown at 16' to the document glass. Similarly, ray 17 is directed from the elliptical reflector through filter 13 to a focal point on the document glass as shown at 17'. At the same time, the infra-red radiation at 16" and 17" is folded back from the hot mirror 13 upon the incandescent lamp 10.

As a result of the arrangement shown in FIG. 1, the hot mirror focuses the IR back onto the source while the visible light passes through the hot mirror and is used to illuminate the document. Since the IR is focused onto the filament, it aids in heating the filament. This, in effect, allows a reduction of the electrical power required to heat the filament to the same temperature, or allows a higher temperature to be reached by the filament for the same electrical power.

Figure 2:
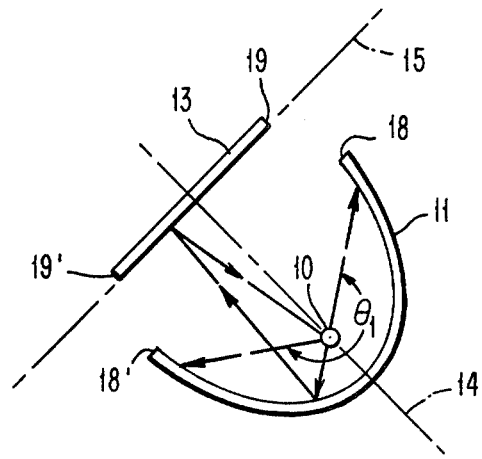
FIGS. 2 and 3 show the angles of radiation in which rays are reflected upon the light source.
Figure 3:
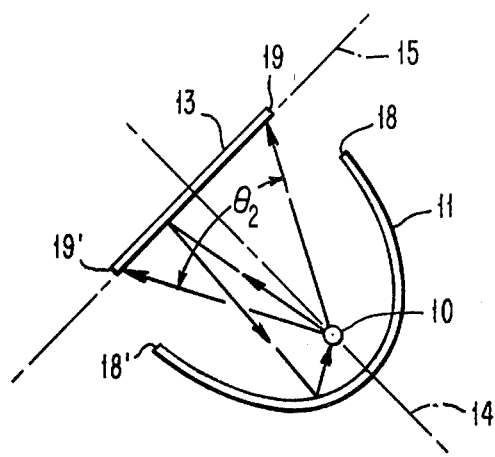
Figure 4:
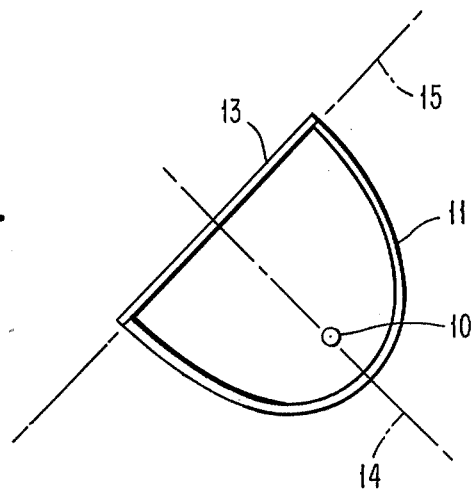
FIG. 4 shows a variation on the structure of FIG. 1.

FIGS. 2 and 3 show that in the arrangement of FIG. 1 a substantial portion of the IR radiation but not all of the IR produced by the lamp source is reflected back upon the filament. Those rays emanating throughout the angles $\theta_1$ in FIG. 2 and the angle $\theta_2$ in FIG. 3 are reflected by the illumination system back upon the filament, while those rays which omanate from the light source and pass between the edges 18 and 18' of the elliptical cylinder and the edges 19 and 19' of the hot mirror are lost to the system. Consequently, in order to collect a full 360 degrees of IR radiation, it is necessary to extend the edges 18 and 18' of the elliptical cylinder until the ellipse forms a full half-section in which case edges 18 and 19 join so that the plane hot mirror can be located against the elliptical cyliner as shown in FIG. 4. Such an arrangement has the further advantage in that it eliminates any angular and spacing adjustment between the filter and the reflector.

Figure 5:
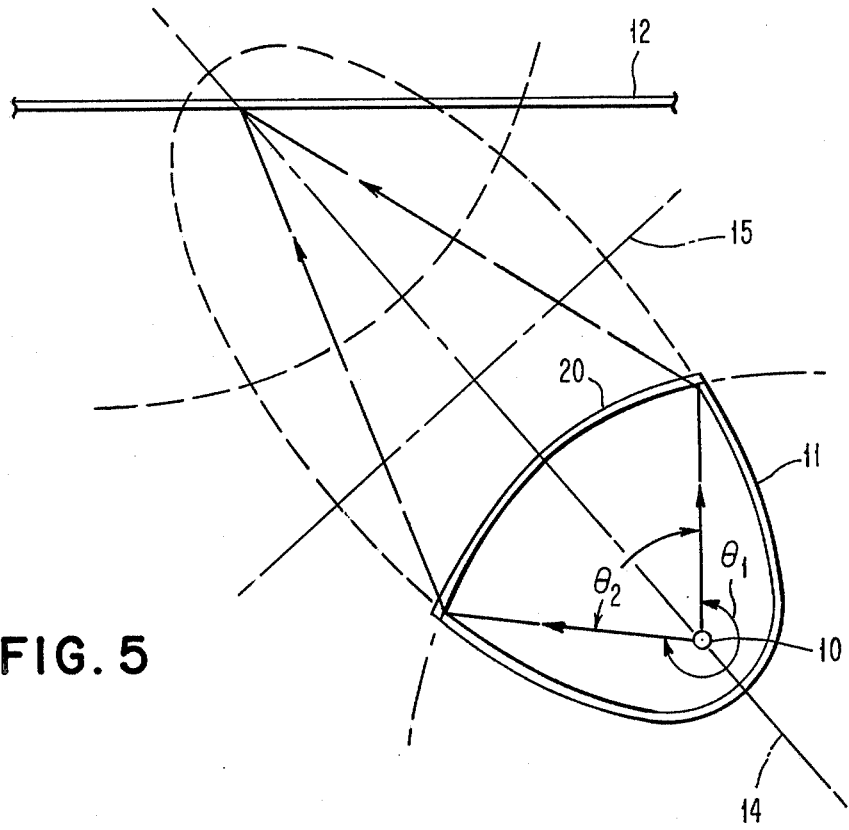
FIG. 5 shows a second embodiment of the illumination system wherein a hyperbolic hot mirror is employed.

In order to reduce the size of the illumination system, another embodiment is shown in FIG. 5, wherein the plane hot mirror of FIG. 1 is replaced by a hyperbolic cylindrical hot mirror 20. By locating the foci of the hyperbolic hot mirror 20 at the foci of the elliptical reflector 11, a full 360° of IR is collected and focused back onto the filament 10. Also, since the hot mirror can be mounted against the elliptical cylinder, all adjustments between the two are eliminated. The illumination system of FIG. 5 is physically smaller than those of FIGS. 1 and 4 because the elliptical cylinder 11 is less than a full half-section.

It may be noted in FIG. 5 that any IR ray contained within $\theta_1$ will stike the ellipse, then the hyperbola, and then be redirected to its source. Any IR ray contained within $\theta_2$ will strike the hyperbola, then the ellipse, and finally be redirected to its source. The visible light within $\theta_1$ passes through the hot mirror and is focused at the document plane.

Figure 6:
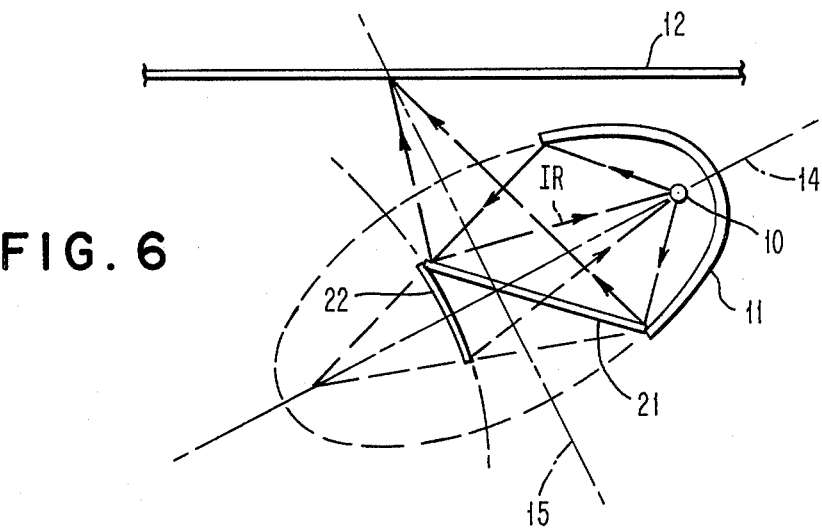
FIG. 6 shows another embodiment of the invention in which a cold mirror is employed with a hyperbolic reflector for reflecting the infra-red spectrum back to the light source.

As mentioned above, cold mirrors are a more efficient filter than hot mirrors. Consequently, the illumination system shown in FIG. 6 has been designed to operate according to the principles of the invention while utilizing a cold mirror. In FIG. 6 the visible light rays are shown emanating from lamp 10, striking the elliptical reflector 11, being directed to the plane cold mirror 21 and from there folded into focus at the document plane 12. The IR portion of these rays passes directly through the cold mirror 21 to a hyperbolic reflector 22 and from there reflected back upon the light source 10. The hyperbolic reflector 22 must be aligned such that its foci is coincident with the foci of the elliptical reflector 11. Note that the cold mirror 21 crosses the minor axis 15.

Figure 7:
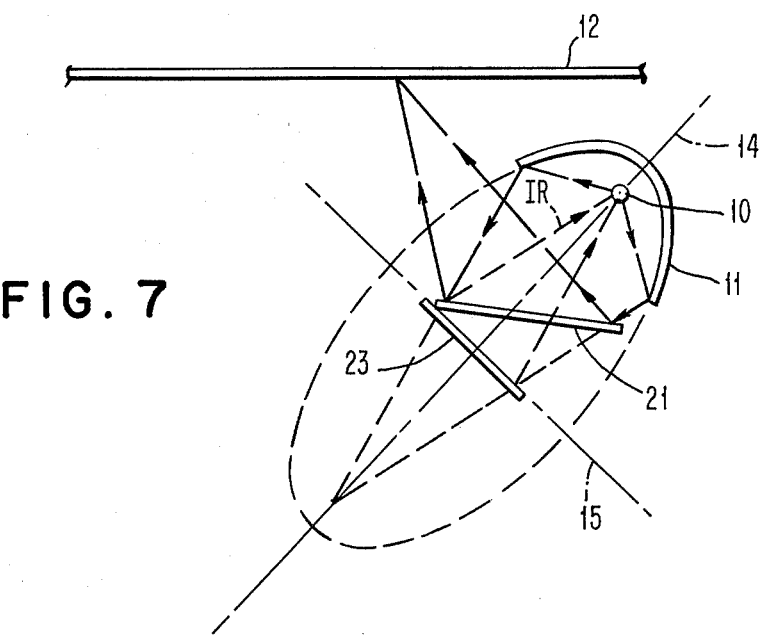
FIG. 7 is still another embodiment of the invention utilizing a cold mirror and a plane reflector.

FIG. 7 shows another embodiment of the system for the case where the cold mirror 21 does not cross the minor axis of the elliptical reflector 11. In this case the plane reflector 23 is shown in position along the minor axis 14 in order to collect the infra-red radiation passing through cold mirror 21 and reflecting these rays back upon the incandescent lamp source 10.

While FIGS. 6 and 7 have the advantage of utilizing cold mirrors and reflect a substantial portion of the infrared radiation back upon the filament and bulb wall, they have the disadvantage over the embodiments shown in FIGS. 4 and 5 of losing that portion of the infra-red radiation which does not strike the hyperbolic reflector 22 or the plane reflector 23.

Figure 8:
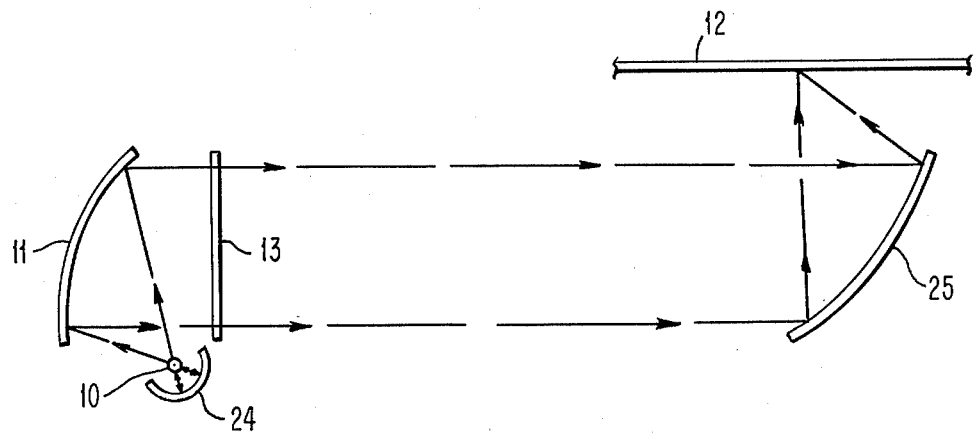
FIG. 8 shows a hot mirror embodiment with parabolic reflectors.

FIG. 8 shows an embodiment wherein a point light source, lamp 10 is located at the center of a spherical concentrator 24 and at the focal point of a paraboloid reflector 11. Both concentrator 24 and reflector 11 are made from aluminum and are polished for high reflectivity. Paraboloid 11 produces a column of light as shown in FIG. 8 which is directed toward scan mirror 25 which is shaped as a parabolic cylinder in order to focus the light at document plane 12. A hot mirror 13 may be inserted at any point in the optical path between reflector 11 and scan mirror 25 in order to separate the IR and focus it back onto the lamp 10. Note that when a hot mirror 13 is not used, parabolic scan mirror 25 would be a cold mirror instead of an ordinary polished aluminum reflector in order to separate the IR; therefore, the use of hot mirror 13 provides a factor of ease in manufacturability over prior art arrangements. Note also that a cylindrical lamp 10 instead of a point light source and a filter shaped as a parabolic cylinder instead of a paraboloid could be used in FIG. 8. However, use of hot mirror 13 would still provide the same significant manufacturing advantage by eliminating the need for a cold mirror at 25.

Figure 9:
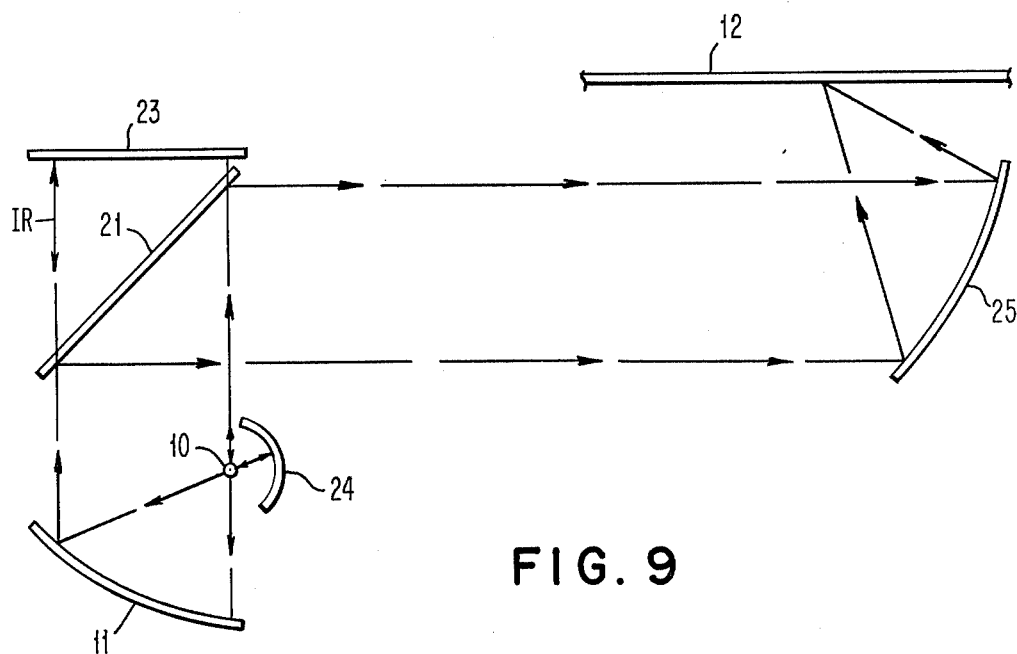
FIG. 9 is a variation on FIG. 8 using a cold mirror scheme.

FIG. 9 is a variation on FIG. 8 utilizing a cold mirror reflecting scheme. Lamp 10 is once again located at the center of a spherical concentrator 24 and at the focal point of a paraboloid reflector 11. A collimated light beam is produced and directed toward plane cold mirror 21 from whence the visible spectrum is redirected to the parabolic cylindrical scan mirror 25 for focusing onto the document plane 12. Meanwhile, the IR is passed through cold mirror 21 to a plane aluminum reflector 23 from whence it is reversed directly back through mirror 21 to reflector 11 for focusing onto lamp 10.

The illumination systems described herein are of particular value to electrophotographic apparatus utilizing tungsten-halogen lamps where there is a frequent on-off operation of the lamp during the copying cycle. Depending on the length of off time, the tungsten-halogen lamp may cool below halogen temperature. Through use of the optical system described herein, the temperature of the bulb wall is brought above the halogen temperature at a quicker rate and kept there for a longer portion of both the on and off time than would otherwise be possible with the result that the illumination intensity of the bulb decreases at a reduced rate with hours of use.

FIG. 10 sets the invention into the perspective of various other components in an existing electrophotographic machine such as the IBM Copier II. The illumination system comprising light source, reflectors and filters such as have been described in the embodiments above is shown at 30 and the document glass is shown at 12. FIG. 10 shows that instead of directing the visible spectrum directly upon the document glass, it structurally may be more convenient to fold the visible spectrum at mirror 31 which then reflects the light upon the document glass 12. FIG. 10 shows the use eventually to be made of the visible spectrum in that the scan of the document glass is shown reflected through a system of mirrors 32–35 to the drum 36 for image reproduction.

While the invention has been particularly shown and described with reference to specific conic sections comprising preferred embodiments thereof, and has been particularly associated with electrophotographic apparatus, it will be understood by those skilled in the art that various changes in uses, form and details may be made without departing from the spirit and scope of the invention.

What is claimed is:

1. An illumination system including an incandescent light source with a filament and bulb wall and including means for separating the visible light spectrum from the infrared spectrum and redirecting a substantial portion of said infrared spectrum to the light source, comprising:
    a reflector means for reflecting both the infrared and visible spectrum, said reflecting means shaped into a conic section with a focal point, said light source located at the focal point of said reflector means;
    a filter means for separating said visible light from said infrared light, said filter means receiving rays from said reflector means; and
    infrared reflecting means receiving rays from said filter means for reflecting at least a substantial portion of said infrared spectrum back upon said light source,
    whereby said filament and bulb wall are heated by the infrared radiation.

2. The illumination system of claim 1 wherein said infra-red reflecting means and said filter means are one and the same.

3. The illumination system of claim 2 wherein said reflector means is shaped as a partial section of an ellipse and wherein said light source is located at the first focal point of the ellipse and the reflector means focuses light produced by said light source toward the second focal point of said ellipse.

4. The illumination system of claim 3 wherein said filter means is a plane heat reflecting interference filter located along the minor axis of said ellipse to redirect said infrared rays toward the first focal point where said light source is located.

5. The illumination system of claim 4 wherein said reflector means is shaped into a full half section of said ellipse and said plane filter is attached to the outer edges of the reflector means along the minor axis, whereby a full 360° of infrared radiation is captured and reflected back upon said light source.

6. The illumination system of claim 3 wherein said filter means is shaped as a hyperbola with the focal point of the hyperbola coincident with the focal point of said ellipse, and wherein the outer edges of the hyperbolic filter are connected to the outer edges of said elliptical reflector means, whereby a full 360° of infrared radiation is captured and reflected back upon said light source.

7. The illumination system of claim 1 wherein said means is shaped as a partial section of an ellipse, wherein said light source is located at the first focal point of the ellipse and wherein the reflector means focuses light produced by said light source toward the second focal point of said ellipse.

8. The illumination system of claim 7 wherein said filter means is positioned at an angle to the minor axis of said ellipse, said filter means crosses said minor axis and is a plane reflector for redirecting the visible spectrum while transmitting the infrared radiation; and
    said means for reflecting said infrared spectrum is a hyperbolic reflector whose focal point is coincident with the second focal point of said ellipse.

9. The illumination system of claim 7 wherein said filter means is positioned at an angle to said minor axis, said filter means does not cross said minor axis and is a plane reflector for redirecting the visible spectrum while transmitting the infrared spectrum; and
    said means for reflecting said infrared spectrum is a plane reflector located along the minor axis of the ellipse.

10. The illumination system of claim 2 wherein said reflector means is shaped as a partial section of a paraboloid and said light source is located at the focal point of said paraboloid to produce a beam of light; and
    said filter means is a plane heat reflecting interference filter located perpendicular to said beam of light to redirect said substantial portion of said infrared back toward the paraboloid.

11. The illumination system of claim 1 wherein said reflector means is shaped as a partial section of a paraboloid and said light source is located at the focal point of said paraboloid to produce a beam of light;
    said filter means located at an angle to said beam of light to reflect the visible spectrum and allow the infrared to pass directly through; and
    said means for reflecting said infrared spectrum is a plane reflector located perpendicular to said light beam for receiving infrared passed through said filter and reflecting said infrared back through said filter means to said paraboloid and on to said light source.

12. In a document copier apparatus with a document station at which light is focused, the system of claim 4 wherein said elliptical reflector forms a section of an elliptical cylinder with a first focal line along which an incandescent tungstenhalogen lamp source is located, and a second focal line toward which light rays from said light source are directed by said reflector for focusing visible light in a line upon the document station.

13. In a document copier apparatus with a document station at which light is focused, the system of claim 5 wherein said elliptical reflector forms a section of an elliptical cylinder with a first focal line along which an incandescent tungsten-halogen lamp source is located, and a second focal line toward which light rays from said light source are directed by said reflector for focusing visible light upon the document station.

14. In a document copier apparatus with a document station at which light is focused, the system of claim 6 wherein said elliptical reflector forms a section of elliptical cylinder with a first focal line along which an incandescent tungsten-halogen lamp source is located, and the second focal line toward which light rays from said light source are directed by said reflector for focusing visible light in a line upon the document station.

15. In a document copier with a document station at which light is focused, the system of claim 8 wherein said elliptical reflector forms a section of an elliptical cylinder with a first focal line along which an incandescent tungsten-halogen lamp source is located, and a second focal line toward which light rays from said light source are directed by said reflector for focusing visible light in a line upon the document station.

16. In a document copier apparatus with a document station at which light is focused, the system of claim 9 wherein said elliptical reflector forms a section of an elliptical cylinder with a first focal line along which an incandescent tungstenhalogen lamp source is located, and a second focal line toward which light rays from said light source are directed by said reflector for focusing visible light in a line upon the document station.

17. In a document copier apparatus with a document station at which light is focused, the system of claim 10 wherein said paraboloid reflector directs said beam of light to a parabolic cylindrical scan reflector for focusing visible light in a line upon the document station.

18. In a document copier apparatus with a document station at which light is focused, the system of claim 11 wherein said paraboloid reflector directs said beam of light to a parabolic cylindrical scan reflector for focusing visible light in a line upon the document station.

* * * * *